W. WRIGHT.

Friction Clutch.

No. { 131 / 1,235. }

Reissued Nov. 19, 1861

Witnesses:

H. Coombs

Geo. Reed

Inventor.

W. Wright per Munn & Co

Att'ys

UNITED STATES PATENT OFFICE.

WENDELL WRIGHT, OF NEW YORK, N. Y.

IMPROVEMENT IN FRICTION-CLUTCHES.

Specification forming part of Letters Patent No. 9,043, dated June 15, 1852; Reissue No. 1,235, dated November 19, 1861.

*To all whom it may concern:*

Be it known that I, WENDELL WRIGHT, of the city, county, and State of New York, have invented a new and useful Improvement in Friction-Clutches; and I do hereby declare that the following is a full, clear, and exact description of the same, reference being had to the accompanying drawings, making a part of this specification, in which—

Figure 1:
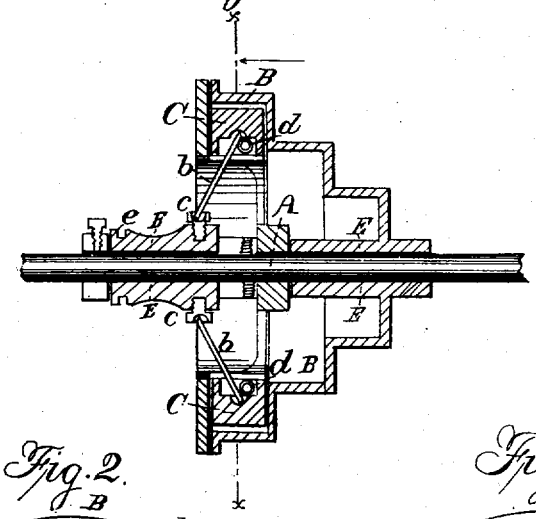
Figure 2:
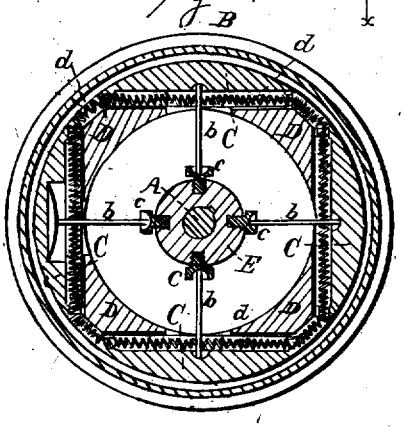
Figure 3:
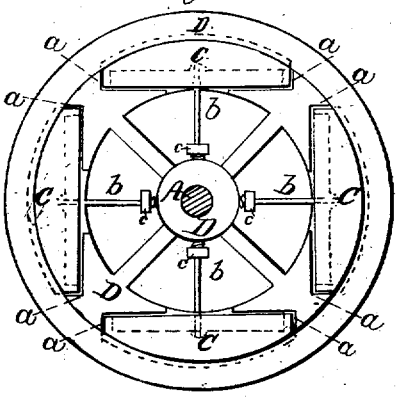

Figure 1 is an axial section of a clutch constructed according to my invention. Fig. 2 is a cross-section at the line *x x* of Fig. 1. Fig. 3 is a view showing the parts as they would appear without the pulley B when seen from the right of Fig. 1.

Similar letters of reference indicate corresponding parts in the several figures.

The object of my invention is to so provide and apply friction-surfaces within a pulley or its equivalent that the friction may be brought into action in a more effective manner than in the friction-clutches heretofore used.

With a view to this end my invention consists, first, in the use within a pulley or its equivalent of segments of metal combined with a sleeve fitted to slide on the same shaft on which the pulley is placed, that by a sliding movement of the said sleeve upon the shaft the said segments may be forced radially outward against the inner periphery of the pulley and so caused to produce friction, by which rotary motion may be imparted from the pulley to the segments, or vice versa; and my invention consists, secondly, in so applying such segments in combination with the shaft and pulley or its equivalent that the centrifugal force developed in the segments by their rotary motion shall be allowed to force them outward against the inner periphery of the pulley, and so be productive of friction between the segments and pulley, and made instrumental in or accessory to the transmission of rotary motion.

To enable others to make and use my invention, I will proceed to describe its construction and operation with reference to the drawings.

A is the shaft. B is the loose pulley applied in the usual manner. C C are the segments, of which there are represented four, but of which there may be any convenient number. These are arranged within the pulley in suitable radial guides, *a a*, provided for them in a wheel, D, which is fast upon the shaft A, and they are held out from the center of the shaft by means of rods *b b*, the outer ends of which enter small cup-like recesses formed in the segments, and the inner ends of which enter small cups, *c c*, screwed into the sleeve E, which is fitted to slide lengthwise upon the shaft. There is also applied to the said segments a spring, *d*, which passes through and around the whole of them and tends to draw them toward the center of the shaft, keeping them to a bearing on the rods *b b* and keeping the said rods to their bearings in the sleeve. It is obvious that separate springs, applied one to each segment, would have the same effect. The rods *b b* are so arranged that by a movement of the sleeve E toward the pulley they are made to assume a position more nearly perpendicular to the shaft, and by a movement of the sleeve in the opposite direction are caused to assume more oblique positions. In assuming a position more nearly perpendicular to the shaft the said rods *b b* are caused to force outward the segments toward the rim or inner periphery of the pulley, and hence, so far as this outward movement is considered, the said rods are equivalent to a toggle. As the rods assume a more oblique position the spring *d* draws the segments away from the rim of the pulley.

To cause the motion given to the pulley B or its equivalent by a belt or other means to be transmitted to the shaft the sleeve E is moved by a forked shipper-lever applied to work in its groove *e*, or by other suitable means, toward the loose pulley, and when the segments are by that means brought into contact with the inner periphery of the rim of the said pulley with sufficient force to produce the requisite amount of friction between the segments and the pulley to overcome the inertia of the segments, the shaft, and the attached machinery the segments, the wheel D, and the shaft are caused to rotate with the pulley. When the segments have the rotary motion imparted to them, the centrifugal force developed in them tends to keep them out in contact with the rim of the pulley, the sleeve being allowed to move longitudinally toward the pulley, and so being prevented from interfering with the action of the segments, and by this action of centrifugal force the necessity of a powerful pressure against the sleeve by means of the shipper-lever or other extraneous mechanical agency to keep the segments pressed outward is in a greater or less degree obviated. To uncouple the shaft from the pulley B it is only necessary to move the sleeve longitudinally away from the said pulley, and the spring *d* draws the segments away from the rim thereof.

What I claim as my invention, and desire to secure by Letters Patent, is—

1. Operating the friction-segments to bring them into and out of contact with the inner periphery of the pulley by means of a connection with a sleeve, E, sliding longitudinally upon the shaft of the pulley, substantially as herein described.

2. So applying the friction-segments in combination with the shaft and pulley that the centrifugal force developed in the segments by their rotary motion shall be allowed to force them outward against the inner periphery of the pulley, and so be productive of friction between the segments and pulley, and made instrumental in or accessory to the transmission of rotary motion, substantially as herein described.

WENDELL WRIGHT.

Witnesses:
JAMES LAIRD,
RICHARDSON GAWLEY.